Figure 1:
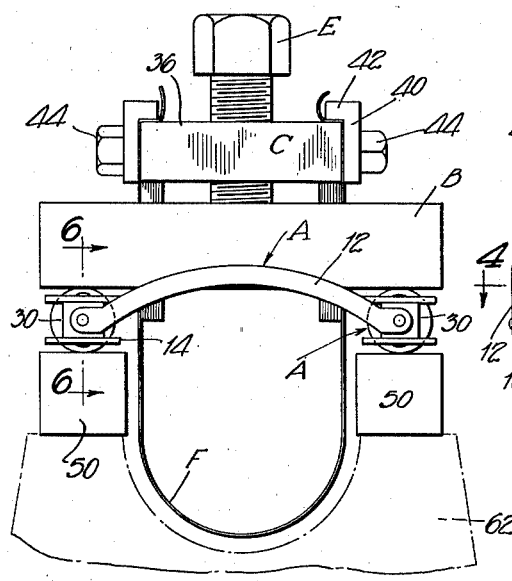

June 24, 1941.  J. W. SLADE  2,246,603
BEARING TOOL
Filed Dec. 21, 1939  3 Sheets-Sheet 1

JAMES W. SLADE.
INVENTOR.

WITNESS:

BY Ely Pattison.
ATTORNEYS.

June 24, 1941.  J. W. SLADE  2,246,603
BEARING TOOL
Filed Dec. 21, 1939  3 Sheets-Sheet 2

JAMES W. SLADE,
INVENTOR.

BY Ely Pattison
ATTORNEYS.

June 24, 1941.  J. W. SLADE  2,246,603
BEARING TOOL
Filed Dec. 21, 1939  3 Sheets-Sheet 3

JAMES W. SLADE.
INVENTOR.

BY Ely Pattison
ATTORNEYS.

Patented June 24, 1941

2,246,603

UNITED STATES PATENT OFFICE 2,246,603

BEARING TOOL

James W. Slade, New York, N. Y.

Application December 21, 1939, Serial No. 310,327

9 Claims. (Cl. 22—123)

This invention relates to new and useful improvements in tools and more particularly it pertains to a tool for use in the proper positioning of shafts and gears carried thereby in order that shaft bearings may be correctly constructed or reconstructed to obtain proper relation between shafts and gear carried thereby.

In certain heavy gear installations it is a common practice to rebabbitt shaft bearings with the shaft in aligned position with relation to the gears and bearings. One example of such practice is the rebabbitting of the sheave shaft bearings in elevator hoisting mechanisms and in its present embodiment, the invention has been illustrated as being employed in connection with such an operation. It is to be understood, however, that the invention is not limited to its illustrated use only and that it is capable of use in other fields.

In elevator hoisting mechanisms the traction sheave or drum is carried by a shaft and is driven by a worm gear which meshes with a worm carried by a worm shaft which is driven by a suitable motor. The gear shaft is supported at one end by a pedestal bearing, the other end being supported by a bearing usually formed as a part of the gear housing. The gear shaft and the worm shaft are positioned at right angles to each other and the bearings in which the gear shaft is mounted are of the babbitted type.

Proper meshing of the worm and worm gear depends upon proper babbitting of the gear shaft bearing and it is to this end that the present tool has been designed.

At present, at least so far as I am aware, when it becomes necessary to rebabbitt the gear shaft bearings of an elevator hoisting mechanism, the bearing caps are removed, the shaft assembly lifted and the worn babbitt linings of the bearings are removed. In attempting to position properly the gear shaft to obtain proper meshing of the worm gear in worm, such make-shift contrivances as slings, jacks, wedges and blocks are employed. Such practice seldom results in proper meshing of the worm gear and worm, mainly because they hamper free or universal movement of the gear shaft and do not permit of a free settling of the teeth of the worm gear into position relative to the worm, and inefficiency, noisy and destructive operation results.

It is the object of the present invention to provide a novel tool the use of which will permit of bringing into proper relation, two angularly disposed shafts in order that a more proper intermeshing of gears carried by said shafts may be obtained than is possible with devices now in use for this purpose, and with which I am familiar.

A feature of the invention resides in the provision of a tool of the aforementioned character which rests or is supported directly upon the shaft bearing after the bearing cap has been removed, the tool being so constructed as to suspend one end of a shaft and permit universal adjustment of the shaft and free motion thereof in all directions.

A further feature of the invention resides in a novel tool whereby a shaft may be supported from a bearing out of contact therewith and in a manner closely akin to "floating."

The invention will be understood from the accompanying drawings illustrating the invention in its preferred form and the following detailed description of the construction therein shown.

Figure 2:
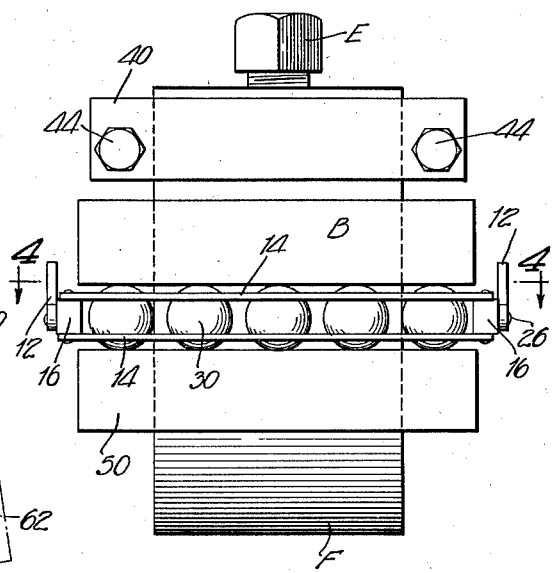
Figure 3:
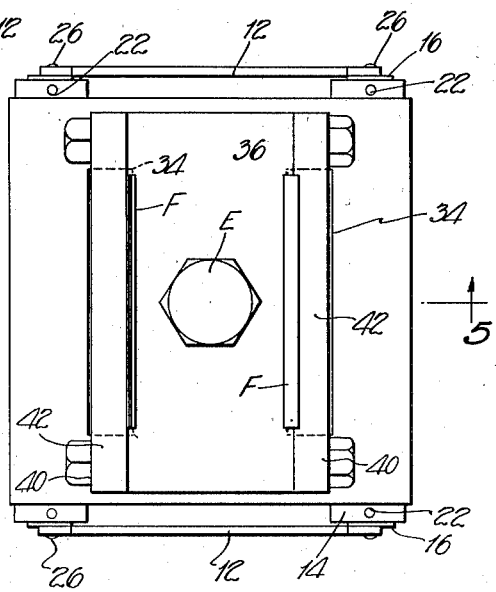
Figure 4:
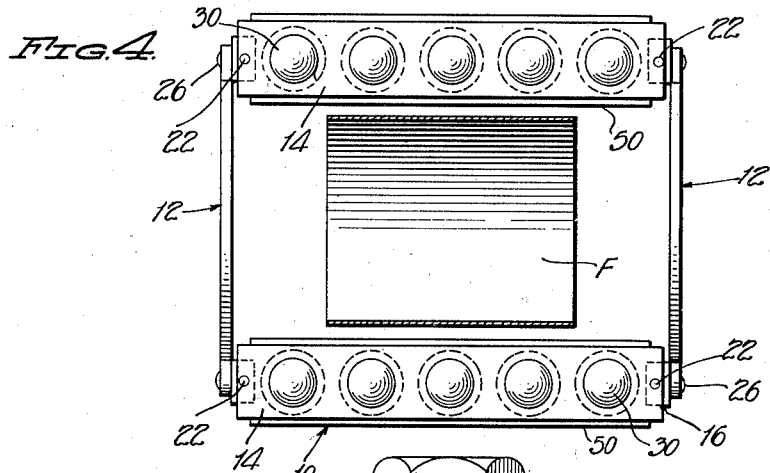

In the drawings:

Figure 1 is a view in end elevation of a tool constructed in accordance with the present invention, a portion of a pedestal bearing being illustrated in broken lines, Figure 2 is a view in side elevation of the tool, Figure 3 is a top plan view of the tool, Figure 4 is a horizontal sectional view taken substantially on the line 4—4 of Figure 2.

Figure 6:
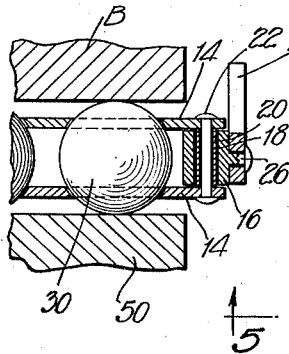
Figure 5:
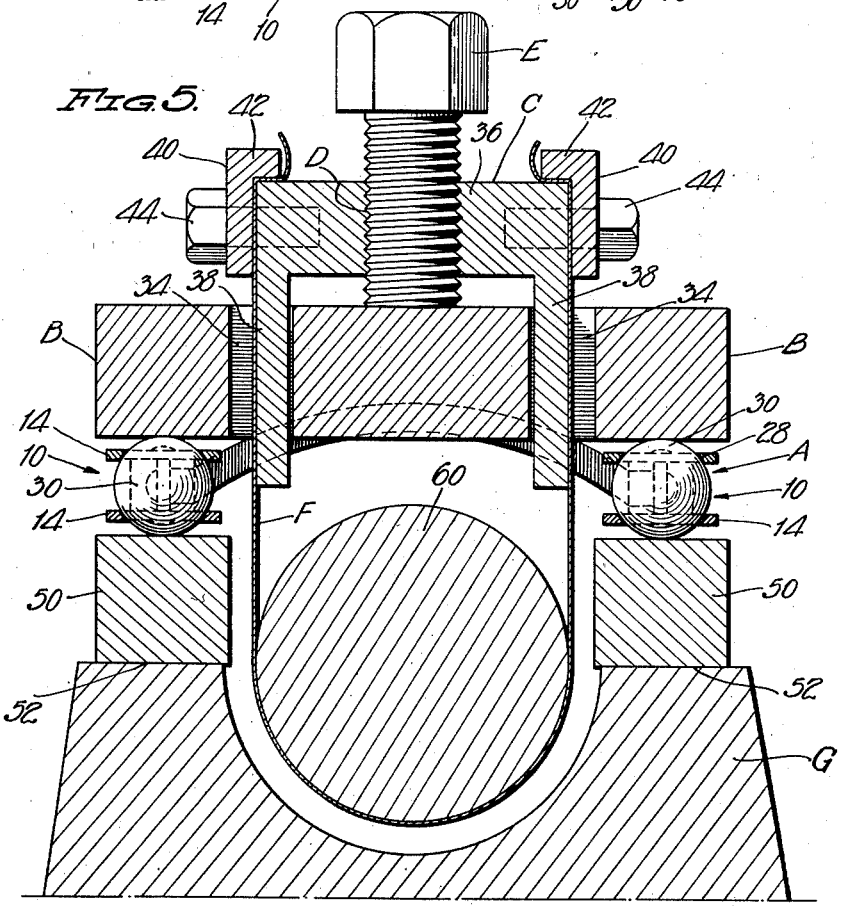
Figure 7:
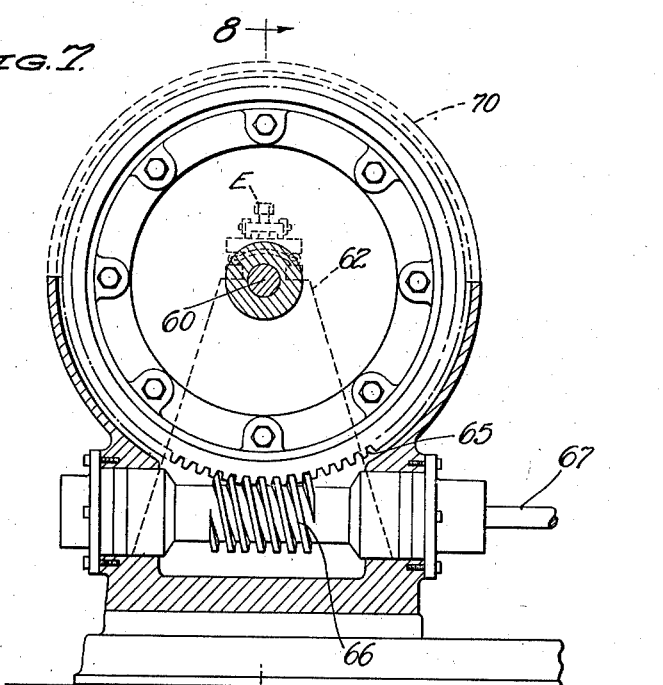
Figure 8:
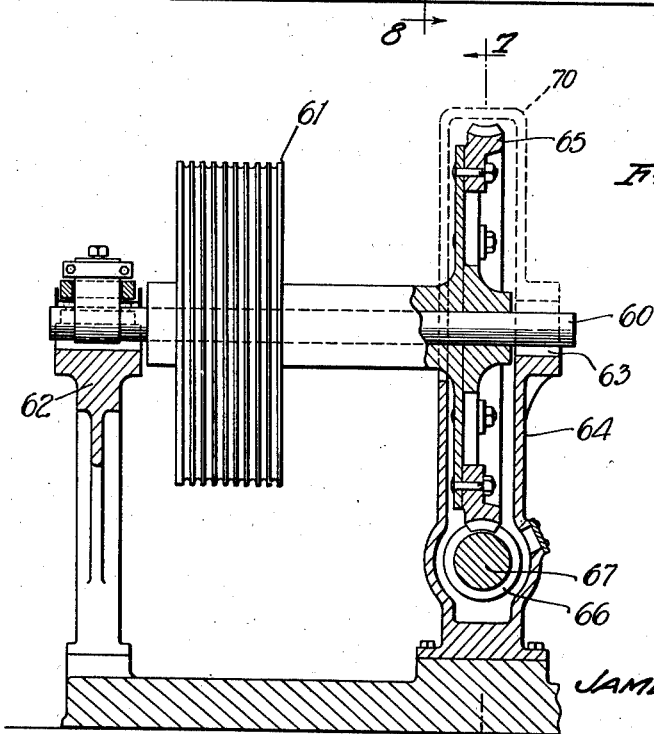

Figure 5 is a transverse sectional view on an enlarged scale, the view being taken substantially on the line 5—5 of Figure 3, Figure 6 is a detail sectional view on an enlarged scale taken substantially on the line 6—6 of Figure 1, Figure 7 is a vertical sectional view taken substantially on the line 7—7 of Figure 8, the view illustrating the driving worm, and worm gear of an elevator hoisting mechanism, the tool being illustrated in dotted lines upon the pedestal bearing, and Figure 8 is a vertical sectional view taken at right angles to Figure 7 and substantially on the line 8—8 thereof, the view illustrating the pedestal and gear housing bearings, the worm gear and driving worm of an elevator hoisting mechanism, the tool being illustrated in position upon the pedestal bearing.

In its illustrated embodiment, the tool comprises a frame-like member which will be hereinafter referred to as the carriage A. Superimposed upon the carriage A, there is a flat plate-like block B and superimposed with relation to the block B, there is a second block C. The block C has a threaded opening D therein for the reception of a bolt E.

As thus far described, the tool has been described in its assembled form, but it is to be understood that except for the threaded connection between the bolt E and the block C, the several parts mentioned are not positively connected together.

The carriage A is of rectangular form having two side members 10 which are connected together by end members 12 in a manner to be hereinafter more specifically described.

The side members 10 of the carriage are of substantially the same construction and each consists of two elongated relatively thin plates 14 which are retained in spaced relation by spacing blocks 16, there being one of said spacing blocks positioned between the plates 14 at each end thereof. Each of the blocks 16 is provided with an opening or passage 18 extending therethrough and mounted in each passage 18, there is a sleeve 20. At their ends, the plates 14 are provided with suitable openings which, when the parts are assembled, register with the passages through the sleeves in order that rivets or the like 22 may be passed through sleeves and plates to secure them together and to the spacing blocks 16. The ends of the sleeves 20 project slightly beyond their respective faces of the spacing blocks 16 thus to insure free rotary movement of the spacing blocks 16 about their respective rivets 22.

The end members 12 are rigid arcuate members and they are pivotally connected to the spacing blocks 16 as at 26.

The plates 14 are provided with spaced openings 28 and before the plates 14 are assembled as heretofore described, roller bearings 30, preferably in the form of balls, are so mounted in the openings 28 of the plates 14 that the plates form retainers for the roller bearings with portions of the roller bearings extending beyond the plates.

The roller bearings 30 form means for supporting the carriage in operative position and in addition, they provide means for supporting the block B which rests upon the projected upper portions thereof.

By reason of the pivotal mounting of the spacing blocks 16 between the plates 14, the side and end members of the frame-like carriage are capable of relative movement in a horizontal plane while the pivotal connections 26 of the end members with the side members permit of relative movement of the members of the frame-like carriage in a vertical plane thus in effect permitting of universal relative movement of the several members of the carriage.

The block B heretofore mentioned has two spaced elongated slots 34 which pass therethrough and the block C has a main body portion 36 from which two parallel arms 38 extend. In operative position, the block C is superimposed upon the block B with the arms 38 of the block C extending through the slots 34 of the block B as best illustrated in Figure 5 of the drawings. The arms 38 of the block C engage the inner side walls of their respective slots 34 which construction provides guiding means for the block C.

Carried by each of two opposite sides of the block C, there is a clamping plate 40, each of which has a flange 42 which overlies the upper face of the block C and these clamping plates are secured to the block C by means of bolts 44.

Threaded opening D passes through the block C at a point substantially in the center thereof and it is within this opening that the bolt E heretofore mentioned is threaded. A shaft suspending member F is suspended from the block C and extends downwardly through the slots 34 of the block B. This shaft suspending member F consists of a flexible band-like member which may be constructed from any suitable flexible material. I prefer for two reasons to use a relatively thin metal for the shaft suspending member F, first it provides the necessary flexibility without stretching, which is highly desirable in maintaining adjustment after the same has been made, and second, such a member permits of use in locations where the clearances between bearings and shafts are extremely slight.

The reference character 50 designates two blocks which, in the present embodiment of the invention are shown as resting upon opposite sides of the bearing surface of a pedestal bearing 62 with the carriage resting upon these blocks 50. These blocks 50 are not, however, necessary to the successful operation of the tool except in cases where the surfaces 52 of the pedestal bearing, due to blowholes or other irregularities, do not present smooth surfaces for the roller bearings of the carriage.

The tool operates in the following manner.

In order more clearly to illustrate the manner in which the tool is operated, I have selected an elevator hoisting mechanism of the traction type and its driving mechanism and reference will now be had to Figures 7 and 8 wherein such a mechanism is illustrated.

In Figures 7 and 8, the reference character 60 designates the sheave shaft of an elevator hoisting mechanism, the traction sheave being designated 61. The shaft 60 is supported at its outer end in a pedestal bearing 62, the opposite end of the shaft being supported in a bearing 63 which, since it is an integral part of the gear housing 64, is generally referred to as the gear housing bearing.

The sheave 61 has a worm gear 65 which meshes with a driving worm 66 carried by a driving shaft 67.

The bearings 62 and 63 in which the sheave shaft is mounted are generally of the babbitted type and do, from time to time, require rebabbitting.

It is highly important to the efficient operation of the mechanism, that a perfect meshing of the worm gear and driving worm result after the bearings have been rebabbitted and of course to obtain this result, proper positioning of the parts, prior to the pouring of the bearings, is necessary and I will now describe the manner in which the tool is employed to obtain such results.

In preparing the mechanism for rebabbitting of the bearings, the cap of the pedestal bearing is removed and the top half of the gear housing which is illustrated in dotted lines in Figure 8 and designated 70 is also removed. The shaft is then removed from the bearings to permit of removal of the linings from the lower halves thereof to prepare them for the new linings. The tool is then positioned upon the pedestal bearing as illustrated in Figure 8, the roller bearings 30 either resting directly upon the surfaces 52 of the bearing or resting upon the blocks 50 which in turn rest upon the surfaces 52 as illustrated in Figure 5. The shaft suspending member F is then passed beneath the shaft 60 and its ends are secured to the block C by the clamping plates 40 and the bolts 44 in the manner illustrated in Figure 5.

By reference to Figure 8, it will be noted that with the parts in the position just described, the entire weight of the shaft 60 traction sheave 61 and worm gear 65 is supported upon the driving worm 66 and the shaft suspending member F of the tool. With the several parts in this position, the shaft 60 and the worm gear 65 are free to move laterally or vertically, or in a circular path upon the fulcrum point provided by the point of contact of the worm gear 65 with the driving worm 66. This free universal movement of the shaft 60, traction sheave 61 and worm gear 65 permits of the worm gear 65 accommodating itself to the driving worm 66 in order that a proper meshing of the teeth and threads of these gears may result. In order to obtain a true right angular relation between the two shafts 60 and 67, the bolt E is operated to raise or lower the shaft 60 until the same occupies a truly level position which may be determined by use of a spirit level or other suitable instrument placed upon the shaft 60. In movement of the shaft 60 to its true level position, the gear 65 is free to move relative to the driving worm 66 thus insuring proper meshing of these gears since the worm gear 65 is able to accommodate itself to the driving worm 66.

With the shaft 60 in its leveled position the lower half of the bearing 63 is poured in the usual manner until the lining contacts with the shaft 60.

After the bearing 63 has been poured, it serves to maintain proper position of its end of the shaft 60 and suitable means such as a jack is placed beneath the sheave 61 to support the outer end of the shaft 60 in the true level position to which it has been adjusted, after which the tool is removed from the outer end of the shaft and the lower half of the pedestal bearing is poured.

After this has been done, the upper half of the bearings are poured in the usual manner and it will be apparent that a true relation between the shafts 60 and 67 and a proper intermeshing of the worm gear and driving worm will result.

By reference to Figure 8 it will be apparent that when the tool is being employed to position the shaft 60, the outer end of the shaft is suspended between the shaft suspending member F and the shaft 60, and the sheave 61 and the worm gear 65 are free to rock about the fulcrum point provided by the resting of the worm gear 65 upon the driving worm 66, thus permitting the worm gear to accommodate itself to the driving worm and resulting in proper intermeshing of the teeth of the worm gear with the thread of the driving worm.

From the foregoing it will be apparent that the present invention provides a new and improved tool by means of which angularly disposed shafts may be relatively positioned in order that proper meshing of gears carried thereby can be obtained. Furthermore, it will be apparent that the tool greatly simplifies the operation of properly positioning angularly disposed shafts relatively to each other and resulting in more efficient meshing of the gears carried by said shafts than it is possible to obtain with usual practices and makeshift devices, heretofore mentioned.

The invention has been herein disclosed in its preferred form. It is to be understood however, that it is not to be limited to the specific structural details herein illustrated and that it may be practiced in such other forms as rightfully fall within the scope of the appended claims.

Having thus described the invention, what is claimed as new is:

1. A tool of the type described comprising in combination, means for suspending one end of a shaft for free movement relatively to a bearing, means supported upon the bearing and freely movable relatively thereto for supporting said shaft suspending means, and means for adjusting the shaft suspending means relative to its supporting means.

2. A tool of the type described comprising in combination, means for suspending one end of a shaft for free movement relative to a bearing, and means for supporting said shaft suspending means, said supporting means including a carriage, roller bearings mounted in said carriage, means resting on said roller bearings and freely movable relative thereto, and means for supporting said shaft suspending means upon said last mentioned means.

3. A tool of the type described comprising in combination, a carriage of frame-like structure, means for loosely connecting the side members of said carriage together to permit of relative movement thereof, roller bearings carried by each of two opposite side members of said carriage and serving to support the same, and shaft suspending means resting upon said roller bearings and freely movable relative thereto.

4. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto, shaft suspending means passing through the slots of said slotted block, and means for supporting said shaft suspending means from said slotted block.

5. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto, a second block superimposed relative to said slotted block, legs depending from said second mentioned block and extending through the slots of the slotted block to form guide means for the second mentioned block, means for adjustably supporting the second mentioned block upon said slotted block, and means depending from said second mentioned block for suspending a shaft therefrom.

6. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto and to the carriage, a second block superimposed relative to said slotted block, legs depending from said second mentioned block and extending through the slots in the slotted block to form guide means for the second mentioned block, means depending from the second mentioned block and extending through the slots of the slotted block to suspend a shaft from the second mentioned block, and means for supporting the second mentioned block upon the slotted block.

7. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto and to the carriage, a second block superimposed relative to said slotted block, legs depending from said second mentioned block and extending through the slots in the slotted block to form guide means for the second mentioned block, means depending from the second mentioned block and extending through the slots of the slotted block to suspend a shaft from the second mentioned block, and means for supporting the second mentioned block upon the slotted block, said means comprising a bolt threaded through the second mentioned block and having its free end engaging the slotted block at a point substantially in the center thereof.

8. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto and to the carriage, a second block superimposed relative to said slotted block, legs depending from said second mentioned block and extending through the slots of the slotted block to form guide means for the second mentioned block, a flexible shaft suspending member secured at its ends to the second mentioned block and having an intermediate looped shaft receiving portion below the plane of the slotted block, and means for supporting the second mentioned block and the flexible shaft suspending member carried thereby from the slotted block.

9. A tool of the type described comprising in combination, a carriage of frame-like structure, means for loosely connecting the side members of said carriage together to permit of relative universal movement thereof, roller bearings carried by each of two opposite side members of the carriage and serving to support the same, a slotted block supported upon said roller bearings and having free movement relative thereto and to the carriage, a second block superimposed relative to said slotted block, legs depending from said second mentioned block and extending through the slots of the slotted block to form guide means for the second mentioned block, a flexible shaft suspending member secured at its ends to the second mentioned block and having an intermediate looped shaft receiving portion below the plane of the slotted block, and means for supporting the second mentioned block and the flexible shaft suspending member carried thereby from the slotted block, and for adjusting the second mentioned block relatively to the slotted block.

JAMES W. SLADE.